(12) United States Patent
Krishna et al.

(10) Patent No.: US 12,326,792 B2
(45) Date of Patent: Jun. 10, 2025

(54) IDENTIFYING ANOMALOUS DEVICE CONFIGURATION

(71) Applicant: MICRO FOCUS LLC, Santa Clara, CA (US)

(72) Inventors: Vamsi Krishna, Bangalore (IN); Kalyan Koka, Bengaluru (IN)

(73) Assignee: Micro Focus LLC, Santa Clara, CA (US)

( * ) Notice: Subject to any disclaimer, the term of this patent is extended or adjusted under 35 U.S.C. 154(b) by 135 days.

(21) Appl. No.: 18/141,437

(22) Filed: Apr. 30, 2023

(65) Prior Publication Data

US 2024/0362137 A1 Oct. 31, 2024

(51) Int. Cl.
| | | |
|---|---|---|
| G06F 11/30 | (2006.01) |
| G06F 8/61 | (2018.01) |
| G06F 9/4401 | (2018.01) |
| G06F 9/445 | (2018.01) |
| G06F 40/284 | (2020.01) |

(52) U.S. Cl.
CPC ............ *G06F 11/3051* (2013.01); *G06F 8/62* (2013.01); *G06F 9/4411* (2013.01); *G06F 9/44505* (2013.01); *G06F 40/284* (2020.01)

(58) Field of Classification Search
CPC ...... G06F 11/3051; G06F 40/284; G06F 8/62; G06F 9/4411; G06F 9/44505
See application file for complete search history.

(56) References Cited

U.S. PATENT DOCUMENTS

| | | |
|---|---|---|
| 9,971,804 B2 | 5/2018 | Brown et al. |
| 10,972,435 B2 | 4/2021 | Biran et al. |
| 11,074,255 B2 | 7/2021 | Chandrashekar et al. |
| 11,449,579 B2 | 9/2022 | Flores et al. |
| 2017/0017537 A1* | 1/2017 | Razin .................. G06F 11/0772 |
| 2018/0052933 A1* | 2/2018 | Verma .................. G06F 16/9535 |
| 2022/0188087 A1 | 6/2022 | Montag et al. |
| 2024/0095073 A1* | 3/2024 | Panitsas ................ G06F 9/5077 |
| 2024/0171609 A1* | 5/2024 | Dema ................... G06F 40/205 |
| 2024/0314566 A1* | 9/2024 | Singh .................... G01S 13/886 |

OTHER PUBLICATIONS

"ZENworks 2020 Asset Inventoy Reference," Oct. 2019.
"w-shingling," https://en.wikipedia.org/wiki/W-shingling, accessed Apr. 30, 2023.
"MinHas," https://en.wikipedia.org/wiki/MinHash, accessed Apr. 30, 2023.

* cited by examiner

*Primary Examiner* — Henry Tsai
*Assistant Examiner* — John B Roche
(74) *Attorney, Agent, or Firm* — Sheridan Ross P.C.

(57) ABSTRACT

Strings of a text file representing a configuration of a target device are respectively tokenized into tokens for the configuration. The tokens for the configuration are shingled. A target device signature representing the configuration of the target device is generated by applying a min-wise independent permutations locality sensitive hashing (MinHash) technique to the tokens as have been shingled. Whether the configuration of the target device is anomalous is identified based on the target device signature.

20 Claims, 8 Drawing Sheets

FIG 2A

```
[HKEY_LOCAL_MACHINE\SOFTWARE\CADApp\CADApp\CADApp Revit 2023]

[HKEY_LOCAL_MACHINE\SOFTWARE\CADApp\CADApp\CADApp Revit 2023\Components]

"ProductName"="Revit 2023"

"ProductCode"="{7346B4A0-2300-0510-0000-705C0D862004}"

[HKEY_LOCAL_MACHINE\SOFTWARE\CADApp\CADApp\CADApp Revit 2023\Components\CadManagerControl]

[HKEY_LOCAL_MACHINE\SOFTWARE\CADApp\CADApp\CADApp Revit 2023\Components\CadManagerControl\CustomerErrorReport]

"EnableRequiredSend"=dword:00000000

"EnableRoundtrip"=dword:00000001

"EnableSendPCName"=dword:00000000

"WaitDuration"=dword:000186a0

"MaxRetainedCount"=dword:00000005

[HKEY_LOCAL_MACHINE\SOFTWARE\CADApp\CADApp\CADApp Revit 2023\Components\CadManagerControl\SubscriptionCenter]

"EnableSubscriptionCenter"=dword:00000001
```

IDENTIFYING ANOMALOUS DEVICE CONFIGURATION

BACKGROUND

The employees and other end users of entities such as corporations and other organizations often have computing devices, such as laptop, notebook, and desktop computers, as well as smartphones, tablet computing devices, and so on, so that they can perform their jobs or other duties. An entity may provide an end user with a computing device or, as has become more common, may permit an end user to use his or her own device. Historically, an administrator or other similarly positioned user of an entity usually deployed an entity-specified and entity-approved configuration on a computing device before providing the device to an end user. For example, the administrator may have installed entity-approved application programs and other software on the device, as well as have configured application, network, and other settings so that the end user is able to use the device to perform his or her job.

More recently, the administrator or the end user him or herself may install such entity-approved (and entity-provided) application programs and other software on a computing device that the end user him or herself provides, as well as configure application, network, and other settings. The user may also be permitted to install other software on the device, regardless of whether the device is the user's own personal device or is a device that the entity has provided, as well as modify application, network, and other settings in ways other than that recommended or specified by the entity. That is, whereas historically the computing devices of end users were locked down such that the end users were prohibited from customizing the devices that they use to perform their jobs or other duties on behalf of their entity, more recently end users have been provided more freedom to reconfigure and install other software on their devices as desired.

BRIEF DESCRIPTION OF THE DRAWINGS

FIG. 6 is a diagram illustratively depicting example assignment of signatures of configurations of two target devices into hash buckets to identify whether the target devices are potentially similar.

DETAILED DESCRIPTION

Figure 1:
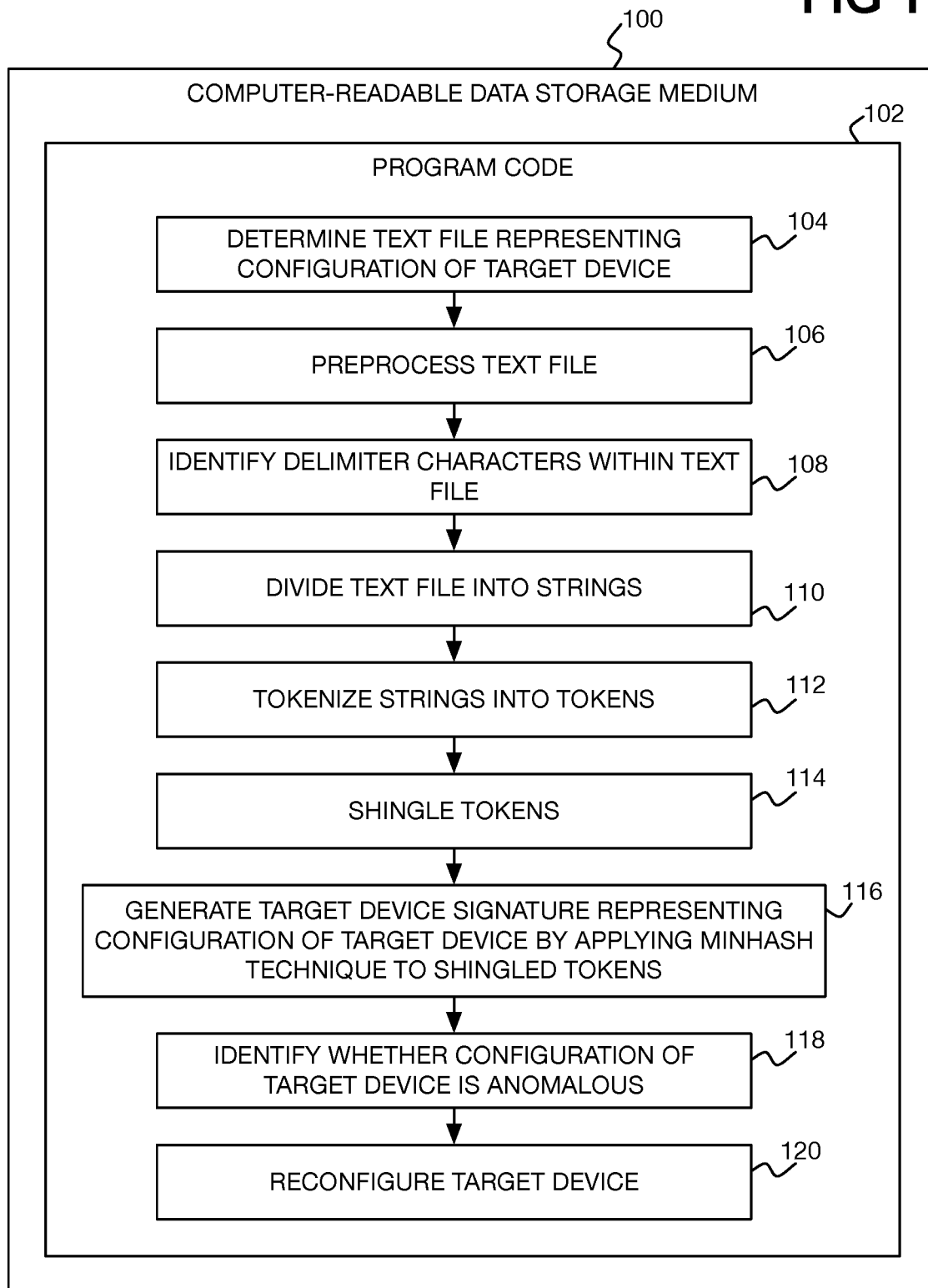
FIG. 1 is a diagram of an example non-transitory computer-readable data storage medium storing program code to identify whether a configuration of a target device is anomalous based on a signature.

As noted in the background, a computing device of an end user of an entity may have application programs and other software installed thereon so that the end user can perform his or her job or other duties on behalf of the entity. Application, network, and other settings of the device may similarly be set so that the end user can perform his or her job or other duties. The end user may also be permitted to install applications and other software in addition to those that the entity provides, as well as to adjust application, network, and other settings in a way different than that which was originally specified.

A computing device of an end user, such as a laptop, notebook, or desktop computer, a smartphone, a tablet computing device, or another type of computing device, has a configuration. The configuration of a computing device generally refers to the arrangement of its functional units, including the hardware and firmware of the device and the software (including the device's operating system and other software software) installed on the device, according to various characteristics of these functional units. Each piece of hardware, software, and so on, can have various parameters and settings that the values of which form part of the computing device's configuration.

A larger entity in particular may task one or multiple administrators with configuration management, which entails the management of the configurations of the computing devices of the entity's end users of the entity. Such configuration management can be performed to ensure that the software installed on each computing device is properly licensed, or otherwise does not have an anomalous configuration. Other example configuration anomalies can include malware installed on a computing device, and software and hardware misconfiguration. Such misconfiguration can result in the device not performing properly and/or exposure of the device to security vulnerabilities that can result in leakage of confidential information and render the entity's computing infrastructure susceptible to cyberattacks and other problems.

When computing devices of end users are locked down, such that just approved software is able to be installed on the computing devices and such that the configurations of the devices are not able to be modified by the end users, identifying anomalous configurations is relatively easy. For example, the configuration of an end user's computing device can be compared to a reference configuration of a reference device of the same type of the end user's computing device. To the extent that the configuration of the end user's device differs from the reference configuration—which may be referred to as the "drift" of the former from the latter—the configuration of the end user's device may be construed as anomalous.

However, if end users are permitted to install other software, in addition to entity-provided and entity-approved software, on their computing devices, and/or are permitted to adjust software, hardware, network, and other settings of their devices, identifying anomalous configurations is more difficult. Simply comparing the configurations of end users' computing devices to a reference configuration can result in identification of many devices as having anomalous configurations when in fact they do not. That is, end users' computing devices can have permissible configurations even though they are relatively dissimilar to a reference configuration, due to the end users being permitted to install other software on the devices and adjust various settings. Therefore, an administrator may be unnecessarily burdened with manually inspecting configurations of computing devices that are not actually anomalous.

Another technique for identifying anomalous configurations of computing devices involves generating and comparing fingerprints of individual applications and known security vulnerabilities to similarly generated fingerprints of a computing device to identify whether the configuration of the computing device is anomalous. If the generated fingerprint of a computing device matches the fingerprint of a known vulnerability, or if the generated fingerprinted of an application installed on the device does not match the reference fingerprint for the application, the device's configuration may be construed as anomalous. However, due to the large number of available applications, as well as the large number of possible security vulnerabilities (including those that have not yet been identified), this technique is limited, and may fail to identify a computing device as having an anomalous configuration when in fact it does.

Still another technique for identifying anomalous configurations of computing devices involves machine learning or another type of artificial intelligence. A machine learning model may be learned that differentiates between anomalous configurations and non-anomalous configurations, for instance, and applied to the configuration of a computing given to identify whether the configuration is anomalous. However, this technique can require a large number of computing resources, and may also entail a large amount of manually generated training data, to be effective. The resource-intensive nature of this technique therefore has limited its adoption as a way to identify whether computing devices have anomalous configurations.

Techniques described herein, by comparison, ameliorate these and other shortcomings in identifying whether computing devices have anomalous configurations. For a target device, such as a computing device of an end user of an entity, strings of a text file representing the configuration of the target device are respectively tokenized into tokens, which are then shingled. A target device signature representing the configuration is generated by applying a min-wise independent permutations locality sensitive hashing (MinHash) technique to the tokens as have been shingled. The resulting target device signature can then be used to identify whether the configuration of the target device is anomalous, such that the target device may be accordingly reconfigured if its configuration is identified as being anomalous.

The generation of a target device signature representing the configuration of a target device eases subsequent analysis of the configuration to identify whether the configuration is anomalous, because the signature is shorter in length that the text file representing the configuration. The usage of the MinHash technique to generate the target device signature provides a computationally efficient (both resource-wise and performance-wise) way to identify similar configurations. For example, subsequent analysis of the target device signature may involve comparing the target device signature to a similarly generated reference device signature of a reference device configuration of a reference device to identify how similar the target device configuration is to the reference device signature and thus whether the configuration is anomalous.

Subsequent such analysis can also or instead include subjecting target device signatures of multiple target devices to a locality-sensitive hashing (LSH) technique that maximizes the likelihood that target devices having potentially similar configurations is identified. That is, the LSH technique maximizes hash collisions on similar inputs (i.e., similar target device signatures). Target devices that are identified as having potentially similar configurations may be subjected to further processing to determine whether or not their configurations are indeed similar. The target devices can then be clustered based on their similarities. Target devices belonging to an outlier cluster (i.e., a cluster having a relatively small number target devices as compared to other clusters) may then be identified as having anomalous configurations.

The techniques described herein, therefore, provide a way to limit the number of target devices that require subsequent manual follow-up by an administrator or other user to assess whether they have anomalous configurations. Target devices having anomalous configurations may be reconfigured, such as by uninstalling software from the devices or by changing software, hardware, network, and other settings of the devices, to resolve the anomalies. The reconfiguration process may be automated, such that target devices having anomalous configurations are automatically reconfigured without intervening manual inspection by an administrator or other user.

FIG. 1 shows an example non-transitory computer-readable data storage medium 100 storing program code 102 to identify whether a target device, such as a computing device of an end user of an entity, has an anomalous configuration. The data storage medium 100 may be a memory or another type of medium 100, and may be part of a management computing device, such as a server of the entity to which the end user belongs, a laptop, notebook, or desktop computer of an administrator of this entity, and so on. A processor of the management device executes the program code 102 to perform processing to identify whether the configuration of the target device is anomalous.

The processing includes determining a text file representing the configuration of the target device (104). For example, an agent or other computer program running on the target device may scan the software installed on the target device and the software, hardware, network, and other settings to generate the text file. The text file may be in the form of a markup language file, such as an extensible Markup Language (XML) file. In one implementation, the text file is generated by an agent installed on the target device in accordance with the ZENWorks Configuration Management platform, available from OpenText Corporation, of Waterloo, Canada. The text file can be said to be determined by a management device executing the program code 102 in that the management device receives the text file from the target device over a network such as the Internet.

The processing can include performing preprocessing on the text file representing the configuration of the target device (106). Such preprocessing may involve, for instance, removing certain characters (e.g., symbols) present within the text file. For example, quotation marks ("and") may be removed from the text file, among other characters.

The processing includes identifying delimiter characters within the text file as may have been preprocessed (108). There may be one or multiple different delimiter characters, which may be prespecified. Delimiter characters can be visible characters as well as characters that are not visible. Example of visible characters include the backslash ("\"), the equals sign ("="), and so on. An example of a non-visible delimiter character includes the end-of-line symbol, which may be visibly represented as a paragraph symbol or mark for convenience ("¶").

The processing includes dividing the text file into strings based on the identified delimiter characters (110). For example, the first character of the text file through the character prior to the first identified delimiter character within the text file constitute the first string of the text file. The character after the last identified delimiter character within the text file through the last character within the text file constitute the last string of the text file. The characters between each pair of successive delimiter characters within the text file (e.g., between the first and second delimiter characters, the second and third delimiter characters, and so on) constitute a corresponding string of the text file other than the first string and the last string.

The processing includes tokenizing the strings into respective tokens for the configuration (112). Each unique string is tokenized into a corresponding unique token, such that identical strings are each tokenized into the same token. A token may itself be an integer, which may be represented in hexadecimal or another format. Whereas the strings may have differing lengths or sizes in bytes, the tokens may have the same length or size in bytes, although in a different implementation, the tokens can have varying length or size. Furthermore, the number of bytes encoding a token is generally shorter than at least some (if not the majority or all) of strings. The number of tokens is equal to the number of strings. For example, strings string1, string2, string3, and so on, into which a text file has been divided may be respectively tokenized into tokens token1, token2, token3, and so on.

The processing includes shingling the tokens for the configuration of the target device (114), which can also be referred to as w-shingling. In one implementation, the shingling that is performed is 2-shingling. In this implementation, each pair of adjacent tokens is shingled into a corresponding shingle. For example, if there are strings string1, string2, string3, and string4,then the resulting shingles are string1-string2; string2-string3; and string3-string4. In general, for N strings, there are N−1 shingles. If instead of 2-shingling a different w-shingling is performed, each w-tuple of adjacent tokens is shingled into a corresponding shingle. For example, if 3-shingling is performed, and if there are strings string1, string2, string3, string4, and string5, then the resulting shingles are string1-string2-string3, string2-string3-string4, and string3-string4-string5.

The processing includes generating a target device signature representing the configuration of the target device by applying a MinHash technique to the tokens as have been shingled—that is, to the shingles (116). As noted above, the MinHash technique is a min-wise independent permutations locally sensitive hashing technique. A MinHash function is applied to the shingled tokens for the target device configuration, with the resulting hash value being the target device signature. The target device signature is in length a smaller series of bits than the set of shingles, but preserves the probability that two similar device configurations will have similar signatures. That is, if two configurations are substantially similar, generating signatures from their shingled tokens using the MinHash technique will result in the signatures themselves being substantially similar.

It is noted that in one implementation, a target device can have multiple configurations. For example, the configuration of the target device for each application installed on or for each different hardware system (processor, memory, network, and so on) of the target device may be analyzed separately, where each configuration has a corresponding signature that is analyzed separately. Furthermore, a singular configuration of the target device may be divided into strings based on different delimiters in different processing iterations, in order to generate different device signatures that are used to identify whether the target device configuration is anomalous.

The processing includes identifying whether the configuration of the target device is anomalous based on the target device signature representing this configuration that has been generated (118). Different techniques for identifying whether a target device configuration is anomalous based on its target device signature are described later in the detailed description. For example, the target device signature can be compared to a reference device signature to identify how similar the target device configuration is to a reference device configuration, such that there is increasing likelihood that the target device configuration is anomalous with increasing dissimilarity to the reference device signature. As another example, multiple target devices, such as the devices of all or a large number of the end user devices of an entity, may be clustered based on the similarities of their target device signatures to identify outlier target devices that have an increased likelihood of having anomalous configurations.

The processing can include, in response to identifying that a configuration of a target device is anomalous, reconfiguring the target device to resolve the anomaly (120). Reconfiguration of the target device can include, for instance, identifying and uninstalling an application from the target device that resulted in the target device configuration having been identified as anomalous. In this respect, once the configuration of the target device has been identified as being anomalous, the target device may be automatically scanned to identify whether any software is installed on the device that is unlicensed, for example. Such software may be uninstalled (or a license for the software may be installed), and the updated target device configuration reanalyzed to verify that the configuration is no longer anomalous.

As another example, reconfiguration of the target device can include reconfiguring settings of an application installed on the target device, or reconfiguring network, hardware, or other settings of the target device, that resulted in the target device configuration having been identified as anomalous. In this respect, once the configuration of the target device has been identified as being anomalous, the target device may be automatically scanned to identify any settings that may have security vulnerabilities. After the settings have been changed to resolve the identified security vulnerabilities, the updated target device configuration may again be reanalyzed to verify that the configuration is no longer anomalous.

In addition to or in lieu of reconfiguration, the target device may be quarantined or isolated for analysis. For example, if the target device configuration has been identified as being analyzed, the device may be removed from the production environment so that whether the device actually includes can be manually verified. If manual verification confirms that there is an anomaly in the target device's configuration, then the device may be reconfigured as has been described. If verification instead determines that there is in no fact no anomaly in the device's configuration, then the device may be removed from quarantine or otherwise returned to service.

Figure 2:
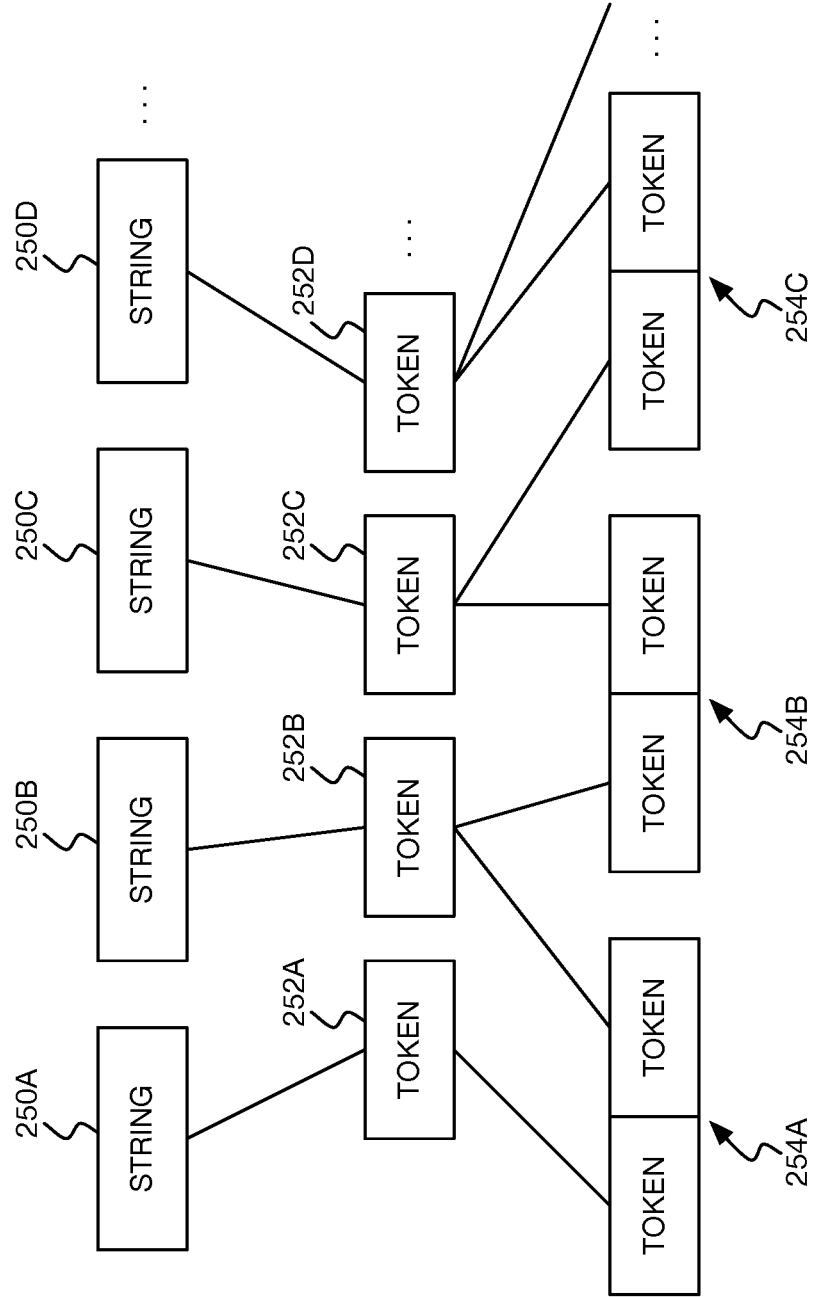
FIG. 2A is a diagram of an example configuration of a target device.
FIG. 2B is a diagram illustratively depicting example tokenization of a configuration of a target device into tokens and example shingling of the tokens.

FIG. 2A shows a text file representing an example configuration 200 of a target device. The configuration 200 may be generated using the ZENWorks Configuration Management platform that has been described, for instance. In the example, the configuration 200 includes information extracted from a hierarchical database maintained by the operating system of the target device, such as the Windows Registry in the case of the Microsoft Windows operating system available from Microsoft Corp., of Redmond, Wash. The non-visible characters signaling line ends in the configuration 200 are visibly denoted by the paragraph symbol ("¶") in the figure.

The configuration 200 may be preprocessed to remove certain characters, such as double quotes (""and""). Thereafter, the configuration 200 can be divided into strings based on identified delimiters. For example, in one implementation, the delimiters may be prespecified as the backsplash ("\"), the equals sign ("–"), the paragraph symbol ("¶"), and both curly braces ("{" and "}"). In this instance, the configuration 200 is divided into the strings "HKEY_LO-CAL_MACHINE", "SOFTWARE", "CADApp", "CADApp", "CADApp Revit 2023", "HKEY_LOCAL_M-ACHINE", and so on.

FIG. 2B shows example tokenization of strings 250A, 250B, 250C, and 250D into tokens 252A, 252B, 252C, and 252D, respectively, and 2-shingling of the tokens 252A, 252B, 252C, and 252D into shingles 254A, 254B, and 254C. For example, the strings 250A, 250B, 250C, and 250D may correspond to the strings "HKEY_LOCAL_MACHINE", "SOFTWARE", "CADApp", "CADApp Revit 2023". Their respective tokens 252A, 252B, 252C, and 252D may each be a different series of six integers AAAAAA, BBBBBB, CCCCCC, and DDDDDD, respectively. In this case, the shingle 254A, which is the concatenation of tokens 252A and 252B, is AAAAAABBBBBB; the shingle 254B, which is the concatenation of tokens 252B and 252C, is BBBBBBCCCCCC; and the shingle 254C, which is the concatenation of tokens 252C and 252D, is CCCCCCDDDDDD.

Figure 3:
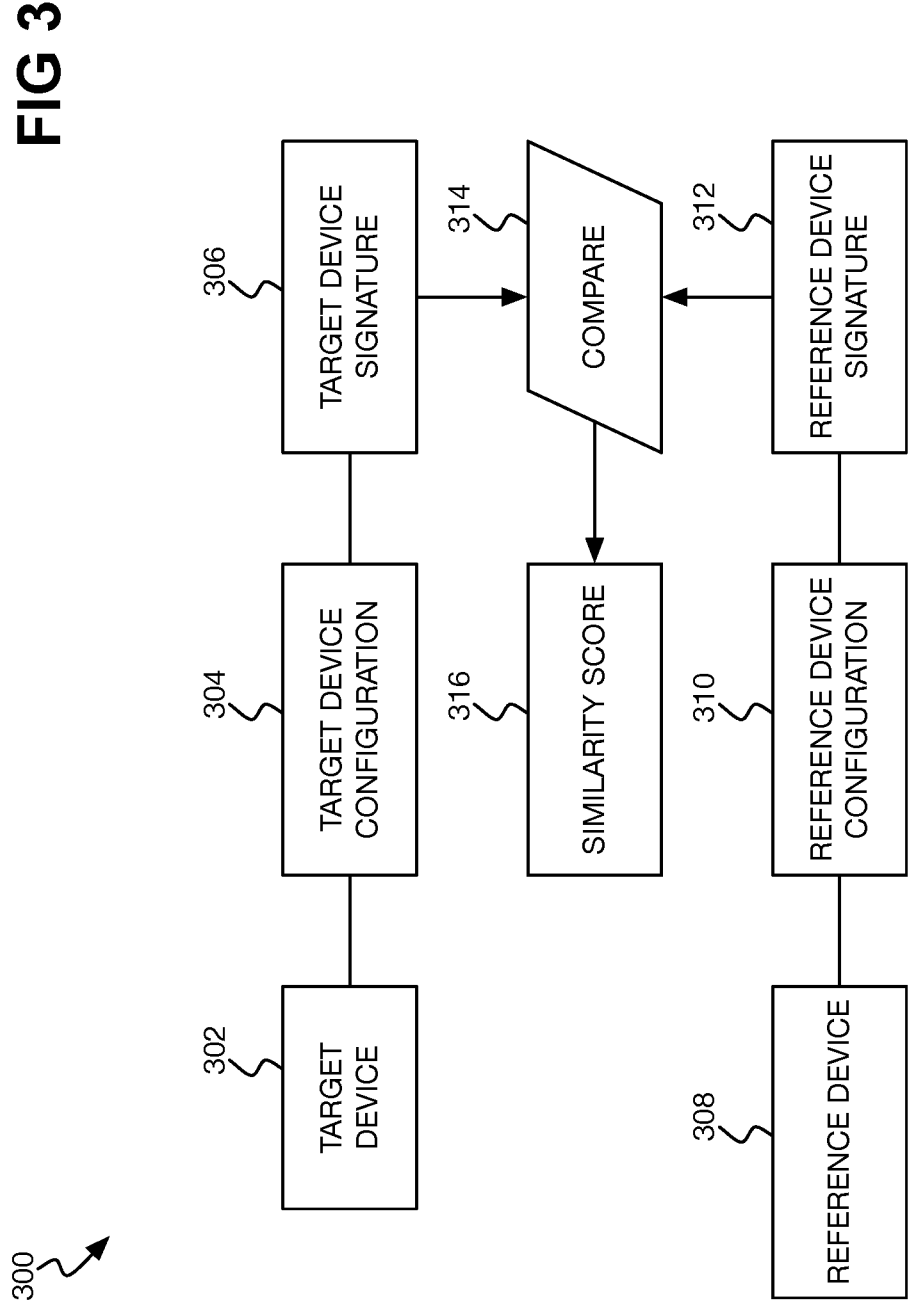
FIG. 3 is a diagram illustratively depicting example determination of whether configurations of target devices are anomalous, by comparing a signature of the configuration of the target device to a signature of a configuration of a reference device.

FIG. 3 illustratively shows an example technique 300 on which basis whether a target device configuration is anomalous can be determined in the processing of FIG. 1. A target device 302 has a target device configuration 304, for which a target device signature 306 is generated as has been described in relation to FIG. 1. A reference device 308 of the same type or kind as the target device 302 has a reference device configuration 310, for which a reference device signature 312 is similarly generated per the processing of FIG. 1.

The reference device configuration 310 may be a standard configuration 310 for the target device 302, for instance. An administrator of the same entity to which the end user having the target device 302 belongs may install entity-recommended software on the reference device 308, and otherwise configure software, hardware, and network settings of the reference device 308 as recommended. Therefore, to the extent that the target device signature 306 differs from the reference device signature 312, the target device configuration 304 may be construed as anomalous.

In one implementation, the target device signature 306 may be compared (314) against the reference device signature 312 to generate a similarity score 316 indicative of how similar the configuration 304 of the target device 302 is to the reference configuration 310. For example, the Jaccard similarity between the target device signature 306 and the reference device signature 312 may be calculated as the similarity score 316. In one implementation, if the similarity score 316 is less than a threshold, then the target device configuration 304 is construed as anomalous.

It is noted that the target device configuration 304 can have a different length than the reference configuration 310. In this case, the configuration 304 will have a different number of tokens than the configuration 310, and thus will have a different number of shingles than the configuration 310 after the tokens shingled. This is permissible, because it is not the configurations 304 and 310 (or their tokens, or their shingles) that are directly compared to one another, but rather device signatures 306 and 312 that are generated from their shingles.

That is, the shingled tokens of the configuration 304 are used to generate the target device signature 306, and the shingled tokens of the reference configuration 310 are used to generate the reference device signature 312. Regardless of the number of shingled tokens on which basis each signature 306 and 312 is generated, the signatures 306 and 312 can have the same length, permitting them to be compared to one another. More generally, therefore, how similar two different device configurations are can be determined even when those configurations have different lengths.

Figure 4:
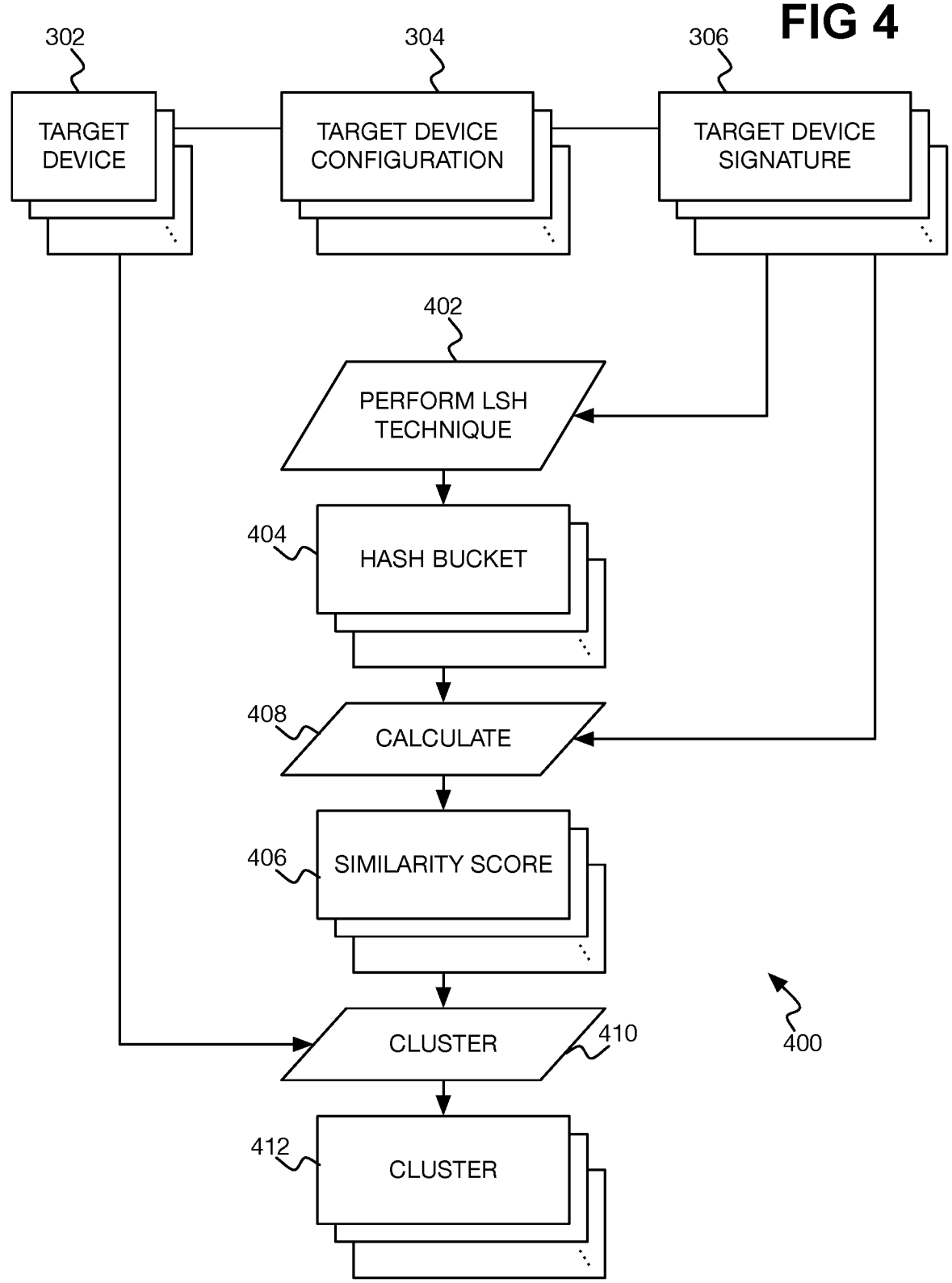
FIG. 4 is a diagram illustratively depicting example determination of whether configurations of target devices are anomalous, by clustering the target devices into clusters.

FIG. 4 illustratively shows another example technique 400 on which basis whether a target device configuration is anomalous can be determined in the processing of FIG. 1. In particular, in the technique 400, whether the configuration of each of a number of target devices 302 is anomalous is determined. The target devices 302 may be those of the end users of an entity. For example, there may be hundreds, thousands, or more of such end users, and thus hundreds, thousands, or more of such respective target devices 302.

The target devices 302 have respective target device configurations 304 for which respective target device signatures 306 are generated as has been described in relation to FIG. 1. An LSH technique is performed (402) on the target device signatures 306 to assign them within hash buckets 404. LSH hashes of similar target device signatures 306 are assigned into the same hash buckets 404 with high probability, to maximize identifying of target devices 302 that likely have similar configurations 304. The total number of hash buckets 404 is significantly smaller than the total number of possible target device signatures 306. Each target device signature 306 is assigned to one or more than one of the hash buckets 404.

The target device signatures 306 assigned to the same hash bucket 404 have a high, but not guaranteed, probability of being similar. Therefore, for each hash bucket 404 to which more than one target device signature 306 has been assigned, a similarity score 406 between each unique pair of target device signatures 306 in the hash bucket 404 is calculated (408). For example, four device signatures A, B, C, and D may be assigned to a given hash bucket 404. There are five unique pairs of device signatures 306 in this case: AB, AC, AD, BC, BD, and CD. A similarity score is calculated for each unique pair that is indicative of how similar the two device signatures 306 of that pair are. Note that no similarity score is calculated between any pair of device signatures 306 that is not assigned to a common hash bucket 404.

A target device signature 306 can be assigned to more than one hash bucket 404. Therefore, a similarity score 406 is calculated between a target device signature 306 and every other target device signature 306 in any such hash bucket 404. For example, device signatures A, B, and C may be assigned to a first hash bucket 404, and device signatures A, C, and D may be assigned to a second hash bucket 404. Therefore, as to the device signature A, a similarity score is calculated between the device signature A and each of device signature B (in the same first hash bucket 404 as the signature A), device signature C (in both the same first and second hash buckets 404 as the signature A), and device signature D (in the same second hash bucket 404 as the signature A).

The target devices 302 can then be clustered (410) within clusters 412 based on the similarity scores 406 that have been calculated. For example, hierarchical clustering, k-means clustering, or another clustering technique can be employed. More generally, the target devices 302 can be said to be clustered based on the assignment of their target device signatures 306 into hash buckets 404. In this respect, in another implementation similarity scores 406 do not have to be used in order to cluster the target devices 302 within clusters 412.

For instance, in the case in which each target device signature 306 is assigned to multiple hash buckets 404, each unique pair of device signatures 306 may be identified as being similar if each signature 306 of that pair is assigned to more than a threshold number or percentage of the same hash buckets 404. For example, device signature A may be assigned to hash buckets 1, 2, 5, and 9; device signature B may be assigned to hash buckets 2, 3, 5, and 11; and device signature C may be assigned to hash buckets, 2, 5, 9, and 10. Therefore, both device signatures A and C have been assigned to hash buckets 2, 5, and 9, and both device signatures B and C have been assigned to hash buckets 2 and 5.

In this case, two target device signatures 306 may be identified as being similar if both device signatures 306 are assigned to at least three of the same hash buckets 404. Therefore, in the example, device signatures A and B may be identified as being similar (since they have both been assigned to three hash buckets 2, 5, and 9), whereas device signatures B and C may be identified as not being similar (since they have both been assigned to just two hash buckets 2 and 5). In this implementation, clustering of the target devices 302 within the clusters 412 may be performed based on which pairs of device signatures 306 have been identified as being similar in this manner, as opposed to based on the similarity score 406 between each pair of device signatures 306 assigned to any common hash bucket 404.

Once the target devices 302 have been clustered into clusters 412, either based on the calculated similarity scores 406 or in another manner that is ultimately based on their target device signatures 306, which target devices 302 have anomalous target device configures 304 can be identified. For example, there may be one or multiple outlier clusters 412 that significantly deviate from the other clusters 412. The vast majority of the target devices 302 may, for instance, be assigned to clusters 412 that each have more than a large threshold number of target devices 302. By comparison, a smaller number of target devices 302 may be assigned to clusters 412 that each have less than a small threshold number of target devices 302. In this case, the latter clusters 412 may be considered outlier clusters 412.

The clusters 412 that are considered outlier clusters 412 may be identified in other ways as well. However, the outlier clusters 412 are determined, though, the target devices 302 assigned to such outlier clusters 412 can be identified as having anomalous configurations 304, or at a minimum the target devices 302 of such outlier clusters 412 can be identified for further analysis to determine whether their configurations 304 are indeed anomalous. Therefore, the described technique 400 is a way to identify target devices 402 having anomalous configurations 304 that does not require a reference device signature 312, in contradistinction to technique 300 that has been described.

Figure 5:
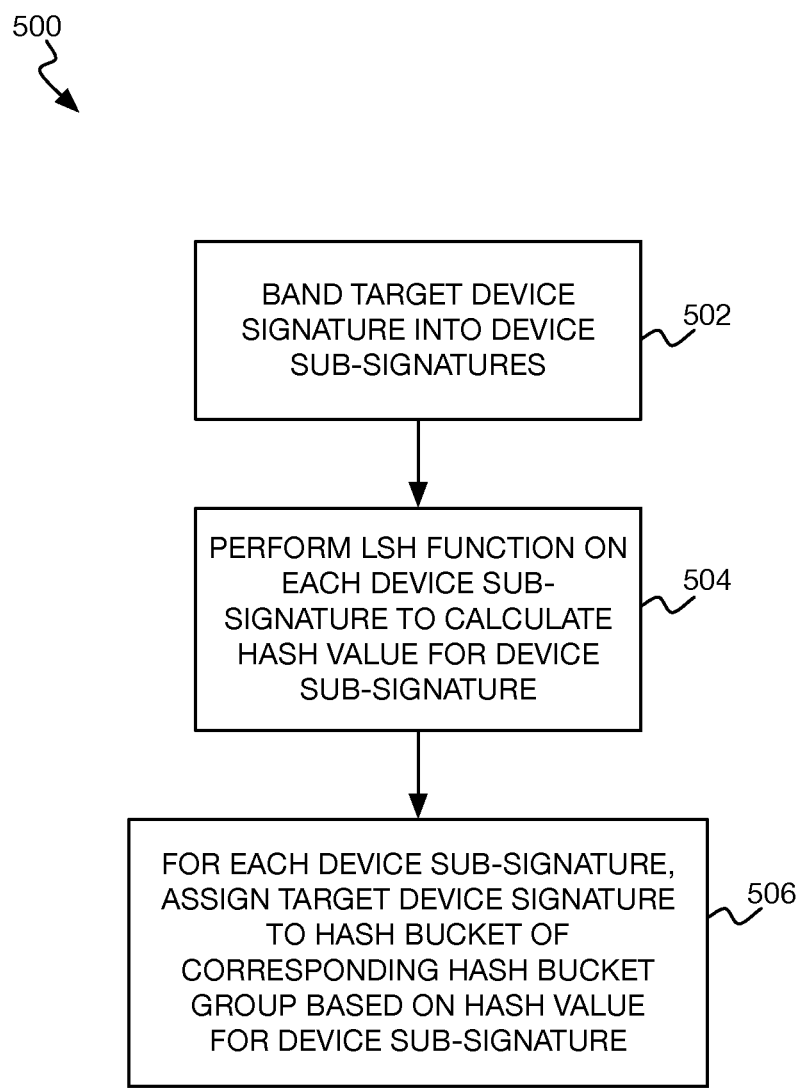
FIG. 5 is a flowchart of an example method for assigning a signature of a configuration of a target device into hash buckets.

FIG. 5 shows an example method 500 for assigning a target device signature 306 into hash buckets 404 using an LSH technique. The method 500 is one way to implement the assignment of each target device signature 306 into hash buckets 404 in the technique 400 that has been described. The method 500 can be implemented as program code stored on a non-transitory computer-readable data storage medium and executed by a processor, similar or no different to the processing that has been described in relation to FIG. 1. The method 500 is separately performed for each device signature 306 and is described in relation to one such signature 306.

The target device signature 306 is banded into multiple device sub-signatures (502). For example, if the device signature 306 has sixteen bytes AAAABBBBCCCCDDDD, the signature 306 may be specifically divided into four sub-signatures, with the first sub-signature being the first four bytes AAAA of the signature 306, the second sub-signature being the second four bytes BBBB, the third sub-signature being the third four bytes CCCC, and the fourth sub-signature being the last four bytes DDDD of the signature 306. The device signature 306 may be banded into multiple device sub-signatures in a different way as well.

An LSH function is performed on each device sub-signature to calculate a hash value for that sub-signature (504). For example, the LSH function is applied to the sub-signature AAAA to calculate a hash value A, and similarly is applied to the sub-signature BBBB to calculate a hash value B. The LSH value is likewise applied to the sub-signature CCCC to calculate a hash value C, and is applied to the sub-signature DDDD to calculate a hash value D. The LSH function is a particular kind of hashing function that is locality sensitive and thus maximizes the likelihood that similar sub-signatures have similar hash values.

Each hash bucket 404 includes a range of hash values. For example, for any possible value of a device sub-signature, there may be a minimum hash value that can be calculated and a maximum hash value that is calculated. Assuming that there is an equality probability that a given sub-signature is hashed by the LSH function into a given hash value, the possible hash values can be divided over a specified number of hash buckets 404 that each have a range of the same number of hash values. For example, if the possible hash values range from 1,000 to 7,999, there can be eight hash buckets 404: a hash bucket 404 encompassing hash values 1,000 through 1,999; a hash bucket 404 encompassing hash values 2,000 through 2,999; a hash bucket 404 encompassing hash values 3,000 through 3,999; and so on.

There is further a number of hash bucket groups corresponding to the number of sub-signatures into which each target device signature 306 is banded. For example, if each device signature 306 is banded into four sub-signatures, then there are four hash bucket groups. Each hash bucket group includes the same hash buckets 404. In the prior example, in which there are eight hash buckets 404, the first hash bucket group corresponding to the first sub-signature of each device signature 306 includes these eight hash buckets 404; the second hash bucket group corresponding to the second sub-signature of each device signature 306 also includes these eight hash buckets 404; and so on. Stated another way, the eight hash buckets 404 into which the possible hash values have been divided are duplicated for each sub-signature.

For each device sub-signature of the target device signature 306, the signature 306 is assigned to one of the hash buckets 404 of the hash bucket group to which the sub-signature in question corresponds, based on the hash value for that sub-signature (506). Therefore, the device signature 306 has been divided into four sub-signatures, the signature 306 is assigned to one of the hash buckets 404 in each of the four hash bucket groups respectively corresponding to the four sub-signatures. While the same hash buckets 404 are duplicated for each sub-signature in a corresponding hash bucket group, a device signature 306 is said to have been assigned to the same hash bucket 404 as another device signature 306 only if both signatures 306 have been assigned to the same hash bucket 404 in the same hash bucket group.

Figure 6:
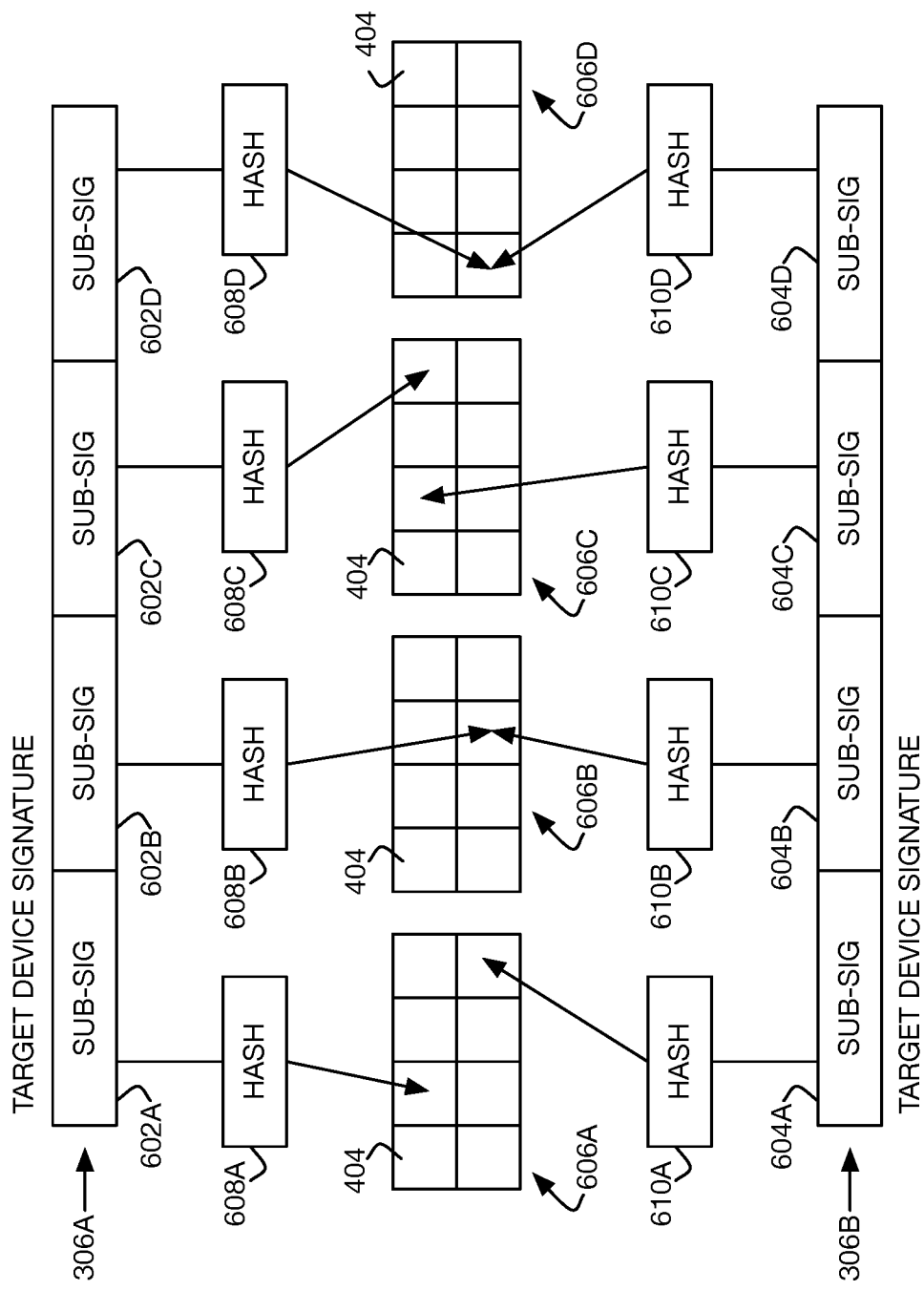

FIG. 6 illustratively shows example performance of the method 500 in relation to two target device signatures 306A and 306B. The device signature 306A is divided into sub-signatures 602A, 602B, 602C, and 602D, and the device signature 306B is divided into sub-signatures 604A, 604B, 604C, and 604D that respectively correspond to the sub-signatures 602A, 602B, 602C, and 602D. There are hash bucket groups 606A, 606B, 606C, and 606D that respectively correspond to the sub-signatures 602A and 604A, the sub-signatures 602B and 604B, the sub-signatures 602C and 604C, and the sub-signatures 602D and 604D.

Each of the hash bucket groups 606A, 606B, 606C, and 606D have the same eight hash buckets 404. That is, the eight hash buckets 404 are duplicated for or in each of the hash bucket groups 606A, 606B, 606C, and 606D. For example, the upper-left hash bucket 404 in each hash bucket group 606A, 606B, 606C, and 606D may correspond to the range of hash values between 1,000 and 1,999; the upper second-from-left hash bucket 404 in each hash bucket group 606A, 606B, 606C, and 606D may correspond to the range of hash values between 2,000 and 2,999; and so on, with the lower-right hash bucket 404 in each hash bucket group 606A, 606B, 606C, and 606D corresponding to the range of hash values between 7,000 and 7,999.

The LSH function is performed on each of the sub-signatures 602A, 602B, 602C, and 602D of the device signature 306A to generate the hash values 608A, 608B, 608C, and 608D, respectively. The device signature 306A is then assigned to one of the hash buckets 404 in the hash bucket group 606A corresponding to the sub-signature 602A based on the hash value 608A for the sub-signature 602A. The device signature 306A is similarly assigned to one of the hash buckets 404 in each of the hash bucket groups 606B, 606C, and 606D based on the hash values 608B, 608C, and 608D, respectively.

Similarly, the LSH function is performed on each of the sub-signatures 604A, 604B, 604C, and 604D of the device signature 306B to generate the hash values 610A, 610B, 610C, and 610D, respectively. The device signature 306B is then assigned to one of the hash buckets 404 in the hash bucket group 606A corresponding to the sub-signature 604A based on the hash value 610A for the sub-signature 604A. The device signature 306B is similarly assigned to one of the hash buckets 404 in each of the hash bucket groups 606B, 606C, and 606D based on the hash values 610B, 610C, and 610D, respectively.

The target device signatures 306A and 306B belong to different hash buckets 404 in the hash bucket group 606A, the same hash bucket 404 in the bucket group 606B, different hash buckets 404 in the bucket group 606C, and the same hash bucket 404 in the bucket group 606D. Therefore, in an implementation in which similarity scores are calculated for clustering target devices 302, the target devices 302 having the signatures 306A and 306B are identified as having potentially similar configurations 304, and a similarity score is calculated between their signatures 306A and 306B. In an implementation in which similarity scores are not calculated for clustering target devices 302, the two target devices 302 having the signatures 306A and 306B may be identified as having similar configurations 304 based on their having been assigned to the same hash bucket 404 in each of at least a threshold number of two bucket groups (specifically the hash bucket groups 606B and 606D).

It is noted that the devices 302 having the signatures 306A and 306B are not identified as having similar or potentially similar configurations 304 due to their both having been assigned to the second-from-left upper-row hash bucket 404 that may correspond to hash values between 2,000 and 2,999. Although the device signatures 306A and 306B are assigned to this same hash bucket 404, they have been assigned to this hash bucket 404 in different hash bucket groups 606A and 606C, respectively. That is, the signature 306A has been assigned to the second-from-left upper-row hash bucket 404 in the hash bucket group 606A (due to the hash value 608A for its first sub-signature 602A), whereas the signature 306B has been assigned to the second-from-left upper-row hash bucket 404 in the hash bucket group 606C (due to the hash value 610C for its third sub-signature 604C).

Stated another way, two target device signatures 306 are not said to be assigned to a common hash bucket 404 if they are assigned to this hash bucket 404 in different hash bucket groups. That is, even though two device signatures 306 have been assigned to a given hash bucket 404, if one device signature 306 has been assigned to this hash bucket 404 in the hash bucket group corresponding to the first sub-signature of each of the two signatures 306, and the other device signature 306 has been assigned to this hash bucket 404 in the hash bucket group corresponding to the third sub-signature, the two signatures 306 are not said to be assigned to the same hash bucket 404 in this respect.

Figure 7:
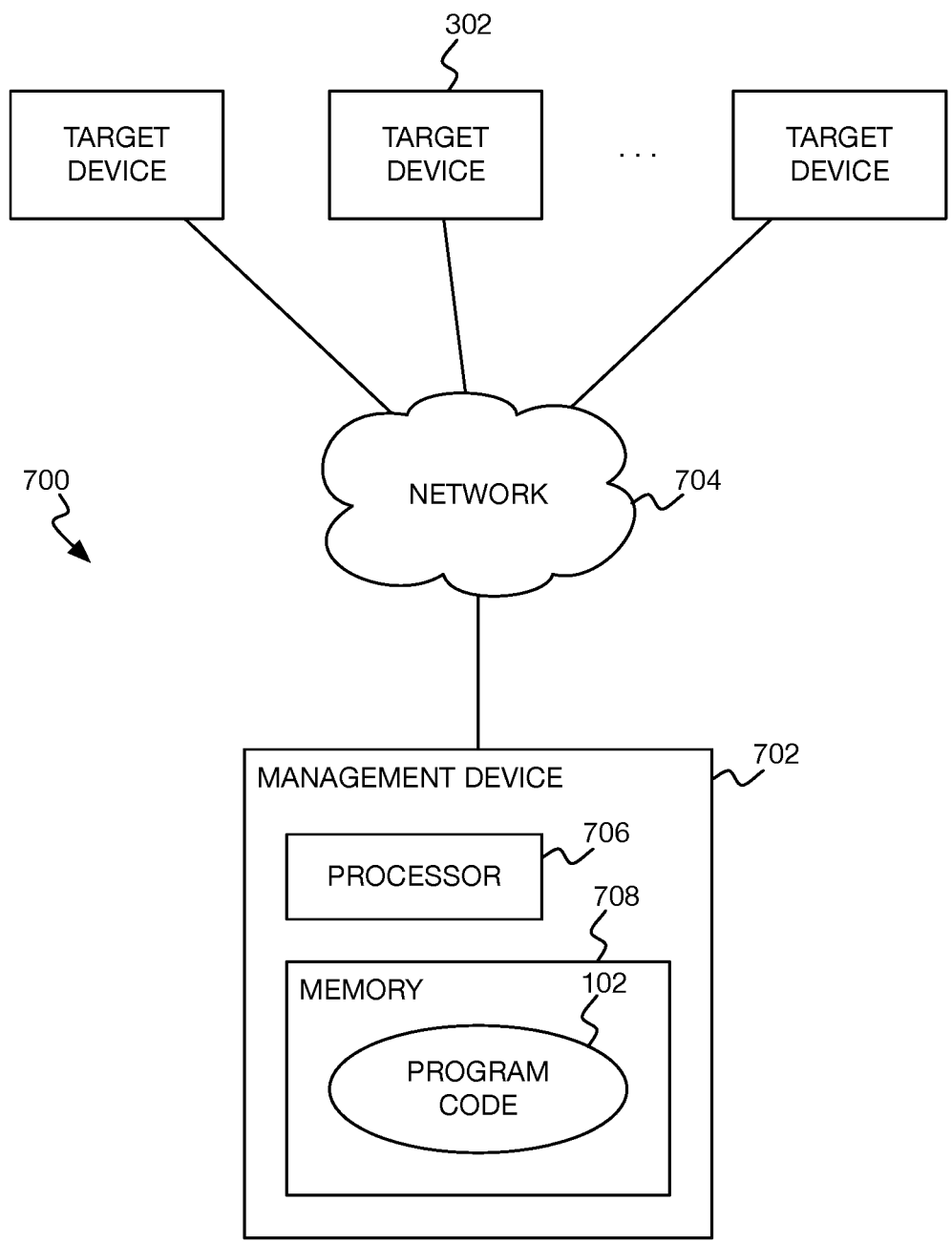
FIG. 7 is a diagram of an example system in which a management device identifies whether configurations of target devices communicatively connected to the management device are anomalous.

FIG. 7 shows an example system 700. The system 700 includes a management device 702 communicatively connected to target devices 302 over a network 704, which may be or include the Internet and/or another type of network. The management device 702 can perform the processing that has been described with reference to FIG. 1. The management device 702 can thus include a processor 706 and a memory 708 storing the program code 102, where the memory 708 is a particular type of non-transitory computer-readable data storage medium 100. The program code 102 is executable by the processor 706 to perform the processing that has been described to identify which of the target devices 302 have anomalous configurations 304, and to accordingly reconfigure such target devices 302 to resolve the anomalies in their configurations 304.

Techniques have been described for identifying target devices 302 that have anomalous configurations 304. The techniques leverage the MinHash technique to generate target device signatures 306 for the configurations 304 in such a way that devices 302 having similar configurations 304 have similar signatures 306. The techniques can also leverage LSH in assigning the signature 306 for each device 302 into multiple hash buckets 404 on which basis devices 302 having similar configurations 304 can be identified. Identifying devices 302 having anomalous configurations 304 in the manners that have been described is not computationally intensive.

The described manners for identifying target devices 302 having anomalous configurations are further robust in consideration of the large number of different applications that can be potentially installed on a device 302 and the large number of known and even unknown security vulnerabilities that a device 302 can potentially have. The described manners also do not necessarily require that an administrator or other user identify or otherwise construct a reference device configuration 310 for the device 302, particularly in the case in which the devices 302 are clustered based on their configurations 304.

We claim:

1. A non-transitory computer-readable data storage medium storing program code executable by a processor to perform processing comprising:
respectively tokenizing a plurality of strings of a text file representing a configuration of a target device into a plurality of tokens for the configuration;
shingling the tokens for the configuration;
determining a target device signature representing the configuration of the target device by applying a min-wise independent permutations locality sensitive hashing (MinHash) technique to the tokens as have been shingled; and
identifying whether the configuration of the target device is anomalous based on the target device signature.

2. The non-transitory computer-readable data storage medium of claim 1, wherein the processing further comprises:
in response to identifying that the configuration of the target device is anomalous, reconfiguring the target device.

3. The non-transitory computer-readable data storage medium of claim 1, wherein reconfiguring the target device comprises either or both of:
identifying and uninstalling a first application from the target device that resulted in the configuration of the target device having been identified as anomalous; and
reconfiguring a second application from the target device having an application configuration that resulted in the configuration of the target device having been identified as anomalous.

4. The non-transitory computer-readable data storage medium of claim 1, wherein the processing further comprising:
comparing the target device signature representing the configuration of the target device to a reference device signature representing a reference configuration of a reference device to calculate a similarity score indicative of how similar the configuration of the target device is to the reference configuration,
wherein identifying whether the configuration of the target device is anomalous is based on the similarity score.

5. The non-transitory computer-readable data storage medium of claim 4, wherein the processing further comprises:
respectively tokenizing a plurality of strings of a text file representing the reference configuration into a plurality of tokens for the reference configuration;
shingling the tokens for the reference configuration; and
generating the reference device signature representing the reference configuration by applying the MinHash technique to the tokens for the reference device signature as have been shingled.

6. The non-transitory computer-readable data storage medium of claim 1, wherein the target device is one of a plurality of devices that respectively have a plurality of device signatures, the device signature of each device represents a configuration of the device, the target device signature is the device signature of the target device that represents the configuration of the target device, and the processing further comprises:

performing a locality-sensitive hashing (LSH) technique on the device signatures to assign the device signatures within a plurality of hash buckets; and
clustering the devices within a plurality of clusters based on assignment of the device signatures within the plurality of hash buckets.

7. The non-transitory computer-readable data storage medium of claim 6, wherein identifying whether the configuration of the target device is anomalous is based on which of the plurality of clusters within which the target device has been clustered.

8. The non-transitory computer-readable data storage medium of claim 6, wherein the processing further comprises:
for each of the plurality of hash buckets within which two or more of the device signatures have been assigned, calculating a similarity score for each of one or more unique pairs of the device signatures that have been assigned to the respective hash bucket,
wherein the devices are clustered within the plurality of clusters based on the similarity score that has been calculated for each of the one or more unique pairs of the device signatures that have been assigned to each of the plurality of hash buckets.

9. The non-transitory computer-readable data storage medium of claim 6, wherein performing the LSH technique on the device signatures comprises, for each device signature:
banding the device signature into a plurality of device sub-signatures respectively corresponding to a plurality of hash bucket groups, each hash bucket group including the hash buckets;
performing an LSH function on each device sub-signature to calculate a hash value for the device sub-signature; and
for each device sub-signature, assign the device signature to one of the hash buckets of the hash bucket group to which the device sub-signature corresponds based on the hash value for the device sub-signature.

10. The non-transitory computer-readable data storage medium of claim 6, wherein the processing further comprises:
for each of a plurality of unique pairs of the device signatures, identifying the devices having the device signatures of the unique pair as similar in response to both of the device signatures having been assigned to each of more than a threshold number or percentage of hash bucket groups,
wherein the devices are clustered over the plurality of clusters based on which of the devices have been identified as similar.

11. The non-transitory computer-readable data storage medium of claim 1, wherein the processing further comprises:
identifying a plurality of delimiter characters within the text file; and
dividing the text file into the plurality of strings based on the plurality of delimiter characters that have been identified.

12. The non-transitory computer-readable data storage medium of claim 1, wherein the configuration is one of a plurality of different configurations of the target device respectively represented by a plurality of different text files that each have a plurality of different strings,
wherein the plurality of different strings of the different text file representing each different configuration are respectively tokenized into a plurality of different tokens for the different configuration, wherein the different tokens for each different configuration are shingled, wherein a different target device signature representing each different configuration is generated by applying the MinHash technique to the different tokens for the different configuration as have been shingled, and wherein whether each different configuration of the target device is anomalous is identified based on the target device signature representing the different configuration.

13. A computing device comprising:

a processor; and a memory storing program code executable by the processor to:

for each of a plurality of devices, respectively tokenize a plurality of strings of a text file representing a configuration of the device into a plurality of tokens for the configuration;

for each of the plurality of devices, shingle the tokens for the configuration of the device;

for each of the plurality of devices, determine a device signature representing the configuration of the device by applying a min-wise independent permutation locally sensitive hashing (MinHash) technique to the tokens for the device signature of the device as have been shingled;

perform a locality-sensitive hashing (LSH) technique on the device signatures to assign the device signatures within a plurality of hash buckets;

cluster the devices within a plurality of clusters based on assignment of the device signatures within the plurality of hash buckets; and for each of the plurality of devices, identify whether the configuration of the device is anomalous based on which of the clusters within which the device has been clustered.

14. The computing device of claim 13, wherein the program code is executable by the processor to further:

reconfigure any device that the configuration of which has been identified as anomalous.

15. The computing device of claim 13, wherein the program code is executable by the processor to further:

for each of the plurality of hash buckets within which two or more of the device signatures have been assigned, calculate a similarity score for each of one or more unique pairs of the device signatures that have been assigned to the respective hash bucket, wherein the devices are clustered within the plurality of clusters based on the similarity score that has been calculated for each of the one or more unique pairs of the device signatures that have been assigned to each of the plurality of hash buckets.

16. The computing device of claim 13, wherein the program code is executable by the processor to perform the LSH technique on the device signatures by, for each device signature:

banding the device signature into a plurality of device sub-signatures respectively corresponding to a plurality of hash bucket groups, each hash bucket group including the hash buckets;

performing an LSH function on each device sub-signature to calculate a hash value for the device sub-signature; and for each device sub-signature, assign the device signature to one of the hash buckets of the hash bucket group to which the device sub-signature corresponds based on the hash value for the device sub-signature.

17. The computing device of claim 16, wherein the program code is executable by the processor to further:

for each of a plurality of unique pairs of the device signatures, identify the devices having the device signatures of the unique pair as similar in response to both of the device signatures having been assigned to a same hash bucket in each of more than a threshold number or percentage of hash bucket groups, wherein the devices are clustered over the plurality of clusters based on which of the devices have been identified as similar.

18. A method comprising:

respectively tokenizing, by a processor, a plurality of strings of a text file representing a configuration of a target device into a plurality of tokens for the configuration;

shingling, by the processor, the tokens for the configuration;

generating, by the processor, a target device signature representing the configuration of the target device by applying a min-wise independent permutations locality sensitive hashing (MinHash) technique to the tokens as have been shingled;

comparing, by the processor, the target device signature representing the configuration of the target device to a reference device signature representing a reference configuration of a reference device to calculate a similarity score indicative of how similar the configuration of the target device is to the reference configuration; and identifying, by the processor, whether the configuration of the target device is anomalous based on the similarity score.

19. The method of claim 18, further comprising:

in response to identifying that the configuration of the target device is anomalous, reconfiguring, by the processor, the target device.

20. The method of claim 18, further comprising:

respectively tokenizing, by the processor, a plurality of strings of a text file representing the reference configuration into a plurality of tokens for the reference configuration;

shingling, by the processor, the tokens for the reference configuration; and generating, by the processor, the reference device signature representing the reference configuration by applying the MinHash technique to the tokens for the reference device signature.

* * * * *